(12) United States Patent
Tsui (10) Patent No.: US 8,526,486 B2
(45) Date of Patent: Sep. 3, 2013

(54) DECISION FEEDBACK EQUALIZER FOR PORTABLE ENVIRONMENTS

(75) Inventor: Ernest Tsui, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 716 days.

(21) Appl. No.: 12/269,606

(22) Filed: Nov. 12, 2008

(65) Prior Publication Data
US 2010/0118931 A1 May 13, 2010

(51) Int. Cl.
*H03H 7/40* (2006.01)

(52) U.S. Cl.
USPC .......................... 375/229; 375/346; 375/350

(58) Field of Classification Search
USPC .................. 375/229–233, 346–350
See application file for complete search history.

(56) References Cited

U.S. PATENT DOCUMENTS

| | | | |
|---|---|---|---|
| 4,825,287 A | | 4/1989 | Baji et al. |
| 5,513,215 A * | | 4/1996 | Marchetto et al. ............ 375/229 |
| 5,777,910 A * | | 7/1998 | Lu .................................. 375/232 |
| 7,616,685 B2 * | | 11/2009 | Fimoff et al. .................. 375/232 |
| 2005/0041732 A1 | | 2/2005 | Kim et al. |
| 2005/0129143 A1 | | 6/2005 | Kang et al. |
| 2005/0286625 A1 | | 12/2005 | Jung |
| 2009/0124204 A1 * | | 5/2009 | Howard et al. ................ 455/59 |

FOREIGN PATENT DOCUMENTS

| | | |
|---|---|---|
| JP | 63-018812 A | 1/1988 |
| JP | 2001-508959 A | 7/2001 |
| JP | 2005-073260 A | 3/2005 |
| JP | 2007-201729 A | 8/2007 |
| WO | 98/23086 A1 | 5/1998 |
| WO | 01/97475 A1 | 12/2001 |

OTHER PUBLICATIONS

Office Action received for Japanese Patent Application No. 2009-255702, mailed on May 24, 2011, 3 pages of English Translation and 3 pages of Japanese Office Action.
Fan et al., "Efficient Robust Adaptive Decision Feedback Equalizer for Large Delay Sparse Channel", IEEE Transactions on Consumer Electronics, May 2005, vol. 51, No. 2, pp. 449-456.
Office Action received for European Patent Application No. 09175569.4, mailed on May 25, 2010, 2 pages of European Office Action.
Extended European Search Report received for European Patent Application No. 09175569.4, mailed on Feb. 24, 2010, 6 pages.
Office Action received for European Patent Application No. 09175519.4, mailed on Dec. 17, 2010, 1 page of European Office Action.
Office Action received for Chinese Patent Application No. 200910224570.8, mailed on May 4, 2012, 7 pages of English Translation and 8 pages of Chinese Office Action.
Office Action received for Chinese Patent Application No. 200910224570.8, mailed on Jan. 14, 2013, 5 pages of English Translation and 3 pages of Chinese Office Action.

* cited by examiner

*Primary Examiner* — Sam K Ahn
*Assistant Examiner* — Janice Tieu
(74) *Attorney, Agent, or Firm* — Sutherland Asbill & Brennan LLP (57) ABSTRACT

A method is provided. The method includes receiving a carrier signal and analyzing the received carrier signal to identify at least one of a static multipath delay and a dynamic multipath delay in the signal. The method also includes configuring an equalizer based upon the at least one of the static and dynamic multipath delays.

16 Claims, 6 Drawing Sheets

DECISION FEEDBACK EQUALIZER FOR PORTABLE ENVIRONMENTS

BACKGROUND

Decision feedback equalizers are known and are in use. Typically, such equalizers are designed for terrestrial environments where long static or quasi-static multipath delays are predominant. These equalizers are not suitable for portable and mobile use such as for notebooks and netbooks. In contrast to roof top antennas that experience primarily static multipaths, portable environments frequently experience time-varying multipaths in addition to the static multipaths. Current demodulators employ equalizers having relatively large number of taps to equalize long delay pre and post cursor echoes. However, such equalizers are not suitable to equalize both long static and short dynamic echoes.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As discussed in detail below, the embodiments of the present invention function to provide a decision feedback equalization technique for time varying channels in portable environments. In particular, the signals received by a receiver are analyzed to identify static and dynamic multipath delays. Further, an equalizer is configured based upon the identified static and/or dynamic multipath delays.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
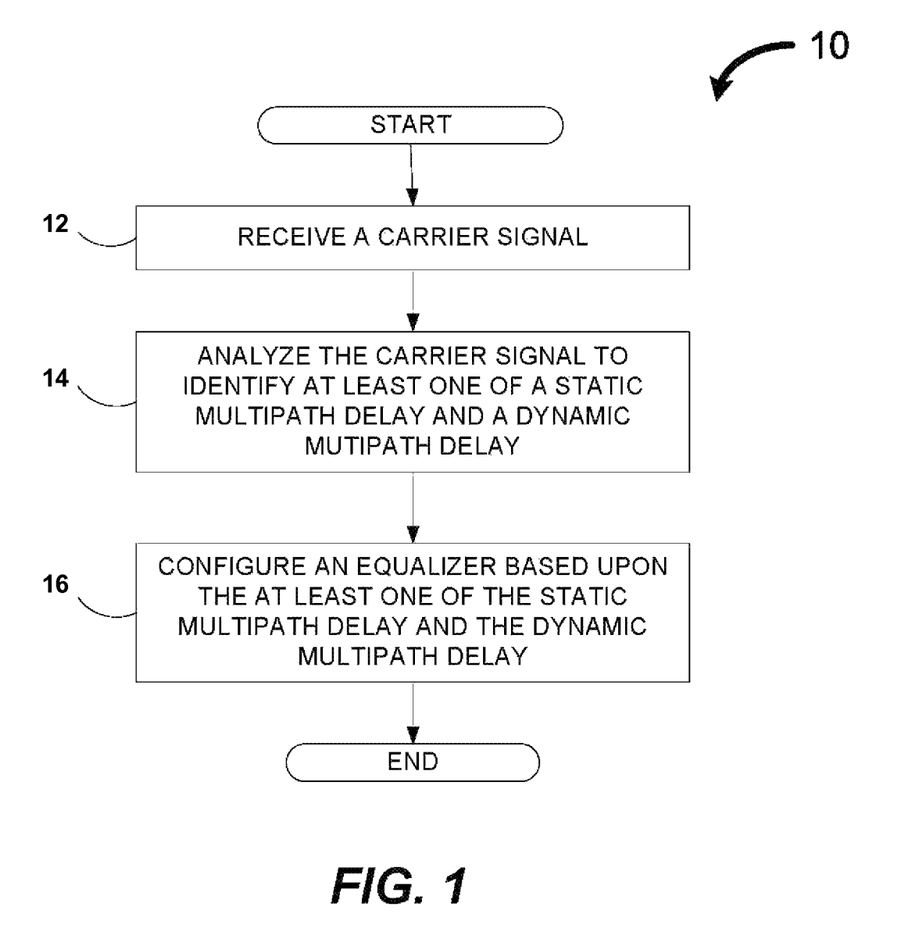
FIG. 1 illustrates an exemplary method for equalization in response to time varying channels in a portable environment in accordance with embodiments of present technique.

Referring first to FIG. 1, illustrates an exemplary method 10 for equalization in response to time varying channels in a portable environment. At block 12, a carrier signal is received. In this embodiment, the carrier signal is received through an antenna of a receiver of a communication module. In one exemplary embodiment, the carrier signal includes an advanced television systems committee (ATSC) signal. In another exemplary embodiment, the carrier signal includes a digital multimedia broadcast-terrestrial/handheld (DMB-T/H) signal.

At block 14, the received carrier signal is analyzed to identify at least one of a static multipath delay and a dynamic multipath delay in the signal. In one exemplary embodiment, a received pseudo-random noise (PN) sequence is compared with a reference sequence to identify the at least one of the static and dynamic multipath delays. However, other techniques to identify the static and dynamic multipath delays may be envisaged.

In this exemplary embodiment, the static multipath delay corresponds to delay caused by reflection from a plurality of static objects. Further, the dynamic multipath delay corresponds to delay caused by reflection from a plurality of moving objects disposed in proximity of the antenna. In one exemplary embodiment, the dynamic multipath delay corresponds to delay caused by a moving vehicle caused reflection proximate to a portable digital television (DTV) receiver platform. In one exemplary embodiment, the static multipath delays correspond to reflections caused by far away static objects such as buildings and/or mountains.

At block 16, an equalizer of the communication module is configured based upon the at least one of the static and dynamic multipath delays. In this exemplary embodiment, the equalizer includes a sparse decision-feedback equalizer. In an exemplary embodiment, a required number of taps of the equalizer to equalize the at least one of the static and dynamic multipaths is estimated. Further, the required number of taps is partitioned into first and second set of taps. The first set of taps is provided to equalize the static multipath delay and the second set of taps is provided to equalize the dynamic multipath delay. In one exemplary embodiment, a position of each of the first and second set of taps is determined.

Figure 2:
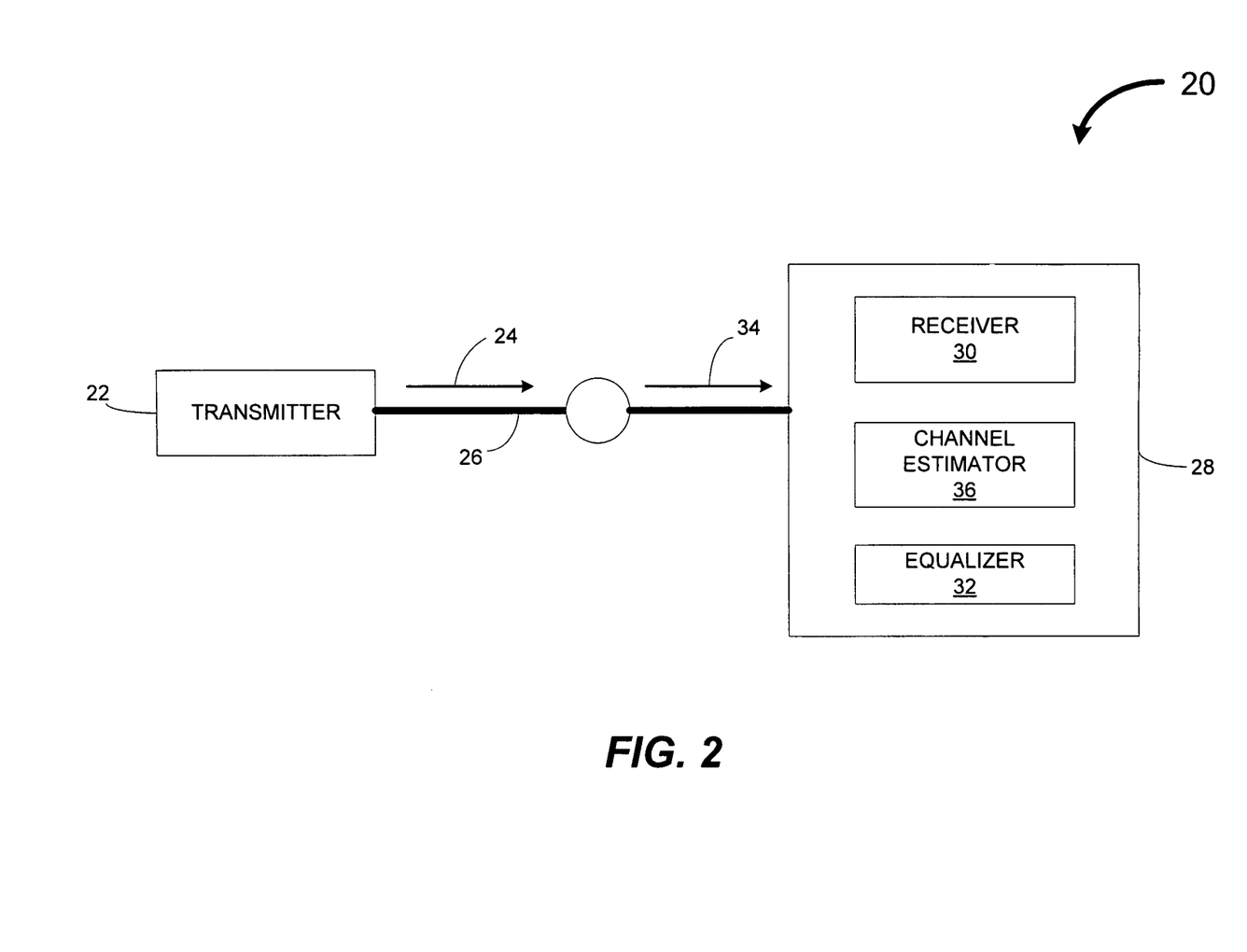
FIG. 2 illustrates an exemplary communication system in accordance with embodiments of present technique.

FIG. 2 illustrates an exemplary communication system 20. In the illustrated embodiment, the communication system 20 includes a transmitter 22 to transmit a plurality of carrier signals, such as represented by reference numeral 24. Such signals 24 are transmitted through a transmission channel 26 to a communication module 28. In this exemplary embodiment, the communication module 28 includes a receiver 30 to receive the plurality of signals 24. The communication module also includes an equalizer 32. The equalizer 32 is to substantially eliminate any distortions caused by the transmission channel 26 and front end electronics.

In this exemplary embodiment, a sampled output for a received signal 34 by the receiver 30 at an instant k is represented by the following equation:

$$y_k = \sum_{n=M_1}^{M_2} h_n x_{k-n} + n_k \tag{1}$$

Where:

x(t) is the transmitted signal 24;

h(t) is a channel impulse response of the transmission channel 26; and y(t) is the received signal 34; wherein y(t) is represented by the following equation:

$$y(t) = h(t) * x(t) + n(t) \tag{2}$$

Where:

* is the convolution operation; and n(t) is the noise or interference.

In this exemplary embodiment, the equalizer 32 is designed to equalize the effect of the channel so that the transmitted signal x(t) 24 is recovered. The communication module 28 includes a channel estimator 36 to analyze each of the plurality of received signals 34 to identify at least one of a static multipath delay and a dynamic multipath delay in the signals. Further, the equalizer 32 is configured based upon the at least one of the static and dynamic multipath delays. In this exemplary embodiment, the equalizer 32 includes a sparse decision-feedback equalizer. However, other suitable equalizers may be employed.

The channel estimator 36 is to analyze each of the plurality of received signals to identify a main path (i.e., a path with the highest power) and multipath delays. In certain embodiments, a received pseudo-random Noise (PN) sequence within the field sync is cross-correlated with a reference pseudo-random Noise sequence. The cross-correlation may be refined, normalized and a threshold may be determined. All peaks above the threshold may represent paths with the maximum representing the principal (i.e., main path) and ones to left of the principal are identified as precursors while ones to right of the principal are identified as postcursors.

Once the main path and multipath delays such as static and dynamic multipath delays are identified, the equalizer 32 may be configured to equalize such multipath delays. In particular, a required number of taps of the equalizer to equalize the static and dynamic multipaths is determined. Further, the required number of taps is partitioned into first and second set of taps (not shown). The first set of taps is provided to equalize the static multipath delay and the second set of taps is provided to equalize the dynamic multipath delay. Such equalization technique facilitates reduction in silicon area for the equalizer along with a reduction in the power consumption.

Figure 3:
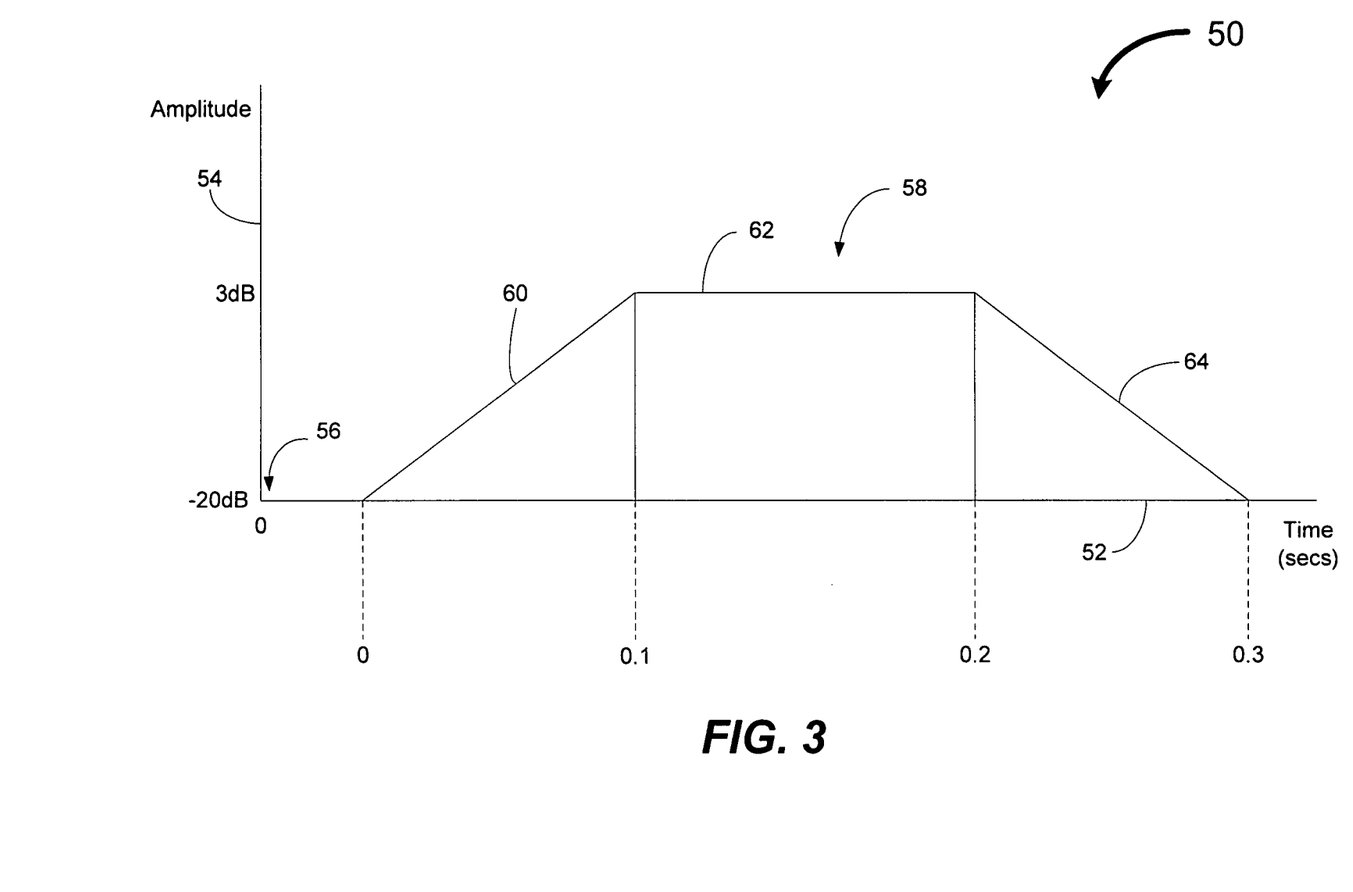
FIG. 3 illustrates an exemplary dynamic multipath delay profile identified by the channel estimator of the communication system of FIG. 2 in accordance with embodiments of present technique.

FIG. 3 illustrates an exemplary dynamic multipath delay profile 50 identified by the channel estimator 36 of the communication system 20 of FIG. 2. In this exemplary event a birth-death event is employed to model effects of a moving object (not shown) such as a vehicle proximate to a portable digital television (DTV) receiver platform like a laptop. In this embodiment, abscissa axis 52 represents time and the ordinate axis 54 represents an exemplary amplitude of the multipath component.

In this embodiment, a reference for a main path is represented by reference numeral 56 and the birth-death multipath event is represented by profile 58. As can be seen, the birth-death event 58 occurs at a delay of τ secs relative to the main path 56. In this exemplary event, the birth ramps up from an amplitude of about −20 dB to about 3 dB in a time period of about 0.1 secs, as represented by reference numeral 60. In this embodiment, the birth-death profile 58 is determined using radar cross section analysis of a large moving vehicle reflector (e.g., truck, bus, etc.) passing in front of a coffee shop window of about 6 feet height at 40 miles/hour vehicle speed. The birth and death occurrence rate is assuming about 2000 vehicles per hour per lane for 3 lanes of traffic.

As represented by reference numeral 62, the amplitude remains steady at 3 dB for about 0.2 secs. Further, the death ramps down from an amplitude of 3 dB to about −20 dB at 0.3 secs. In certain embodiments, the birth-death occurrences follow a Poisson distribution. In this exemplary embodiment, a birth-death delay of about 200 nsec is assumed for an indoor environment which corresponds to a reflecting object at a distance of about 60 meters from the receiver 30 (see FIG. 2) of the communication system 20 (see FIG. 2). For a symbol duration of about 92.9 sec at an ATSC signal rate of about 10.76 Msps, the number of taps required for the equalizer 32 (see FIG. 2) would be relatively low.

In certain embodiments, a plurality of taps (not shown) are provided in the equalizer 32 to equalize the dynamic multipath delay as described above. In one exemplary embodiment, the plurality of taps are provided in feedforward and feedback sections of the equalizer 32 to equalize the dynamic multipath delay. In one exemplary embodiment, the number of taps is less than about 32. In another exemplary embodiment, the number of taps is about 10. Thus, a pre-determined number of taps may be provided around a principal tap (not shown) of the equalizer 32 to account for time-variable short multipath delays from nearby moving objects such as cars, trucks and people. In operation, when a birth-death event occurs, the tap corresponding to the birth-death delay evolves from zero to a value higher than the principal depending on the birth-death event multipath and then become negligible after the birth-death ramp down.

In one exemplary embodiment, an adaptation constant of a least mean square (LMS) algorithm employed by the equalizer 32 is estimated. It is noted that the adaptation constant for the least mean square algorithm is selected based on the number of taps of the equalizer 32 and a received signal power. For a dynamic multipath delay event, as the number of taps is increased, the range of the adaptation constant becomes relatively small. As a result, beyond a certain value there may not be equalizer convergence (i.e., equalizer tracking with small error) for the time varying birth-death events. Therefore, the total number of taps corresponding to the dynamic multipath delay is relatively small. In this exemplary embodiment, a few taps are provided around the principal tap to equalize the dynamic multipath delay.

In this exemplary embodiment, the equalizer 32 is configured based upon the static multipath delay. In particular, a first set of taps is provided to equalize the static multipath delay, wherein a number of the first set of taps is at least about a number of delays that are required to be equalized. Further, the adaptation constant of the least mean square algorithm is determined based upon the number of major static multipath delays rather than the "length" of the static delays. In one embodiment, the adaptation constant for the dynamic multipath delays is relatively larger than the adaptation constant for the static multipath delay.

Figure 4:
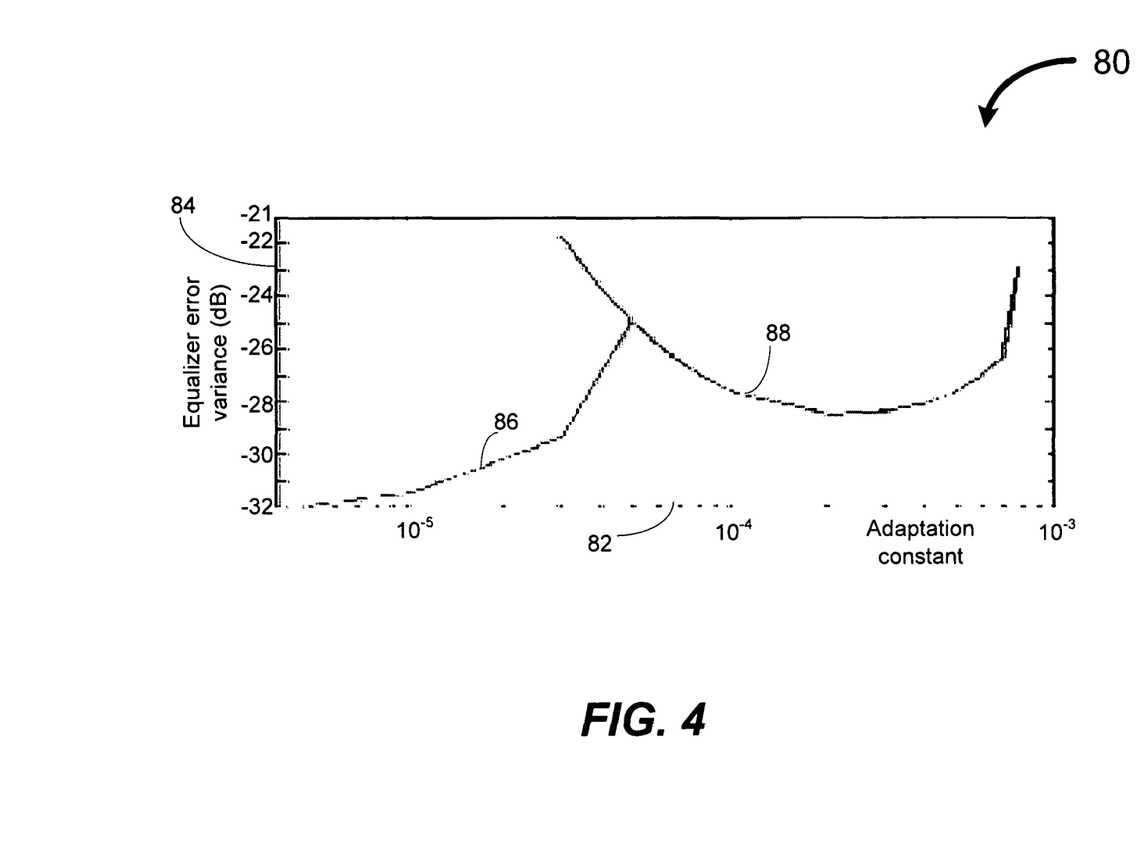
FIG. 4 illustrates an exemplary profile for an equalizer error variance in relation with an adaptation constant for the least mean square algorithm in accordance with embodiments of present technique.

FIG. 4 illustrates an exemplary profile 80 for an equalizer error variance in relation with an adaptation constant for the least mean square algorithm. In the illustrated embodiment, the abscissa axis 82 represents the adaptation constant and the ordinate axis 84 represents an equalizer error variance (dB). The profile for a conventional equalizer having a large number of taps is represented by reference numeral 86 and the profile for an equalizer designed for a portable mobile channel having a relatively less number of taps is represented by reference numeral 88. As can be seen, the equalizer for the portable mobile channel requires a relatively higher value of the adaptation constant as compared to the conventional equalizer. Further, the conventional equalizer may have an unacceptable increase in the error variance if subjected to the required large portable adaptation constant.

In this exemplary embodiment, a sparse decision feedback equalizer is employed that allows for a larger value of the adaptation constant due to fewer non-zero taps. Advantageously, this improves the convergence and reduces computations for the equalizer. In this exemplary embodiment, only taps at precursor, postcursor and their crossterm locations are set to be non-zero. Further, a few non-zero taps about the principal tap are provided to account for the dynamic multipath delays. In the absence of a birth-death event, the non-zero taps about the principal tap will not affect the overall performance of the equalizer.

In one exemplary embodiment, the equalizer response is represented by the following equation:

$$E(z)=H^{-1}(z) \quad (1)$$

Where: H(z) is the channel transfer function. Further, the equalizer response is represented by the following equation for an example of one pre-cursor path, one main path, and one post-cursor path:

$$E(z)=(\beta z^{\tau\beta}+1+\alpha z^{-\tau\alpha})^{-1} \quad (2)$$

$$E(z) \approx 1-(\beta z^{\tau\beta}+\alpha z^{-\tau\alpha})+(\beta z^{\tau\beta}+\alpha z^{-\tau\alpha})^2 \quad (3)$$

$$E(z) \approx 1-(\beta z^{\tau\beta}+\alpha z^{-\tau\alpha})+2\alpha\beta z^{\tau\beta}+\beta^2 z^{2\tau\beta}+\alpha^2 z^{-2\tau\alpha} \quad (4)$$

Where:
($\beta,\tau_\beta$) is the precursor; and
($\alpha, \tau_\alpha$) is the postcursor.

Thus, there is a principal tap, a precursor tap, a postcursor tap and a crossterm tap (fourth term in equation 4) in the equalizer. In certain embodiments, second (fifth and sixth terms in the equation 4) and higher order taps may be ignored depending on a magnitude of amplitudes $\alpha$ and $\beta$. In one exemplary embodiment, the crossterm for a precursor at about −25 μsecs and a postcursor at about 47 μsecs is estimated as follows:

$$\tau_\beta-\tau_\alpha=-25+47=22 \text{ μsecs}=237 \text{ } T/2 \text{ spacing}=118.5 \text{ } T \text{ spacing.}$$

Where:
T is a 64-staggered quadrature amplitude modulation (QAM) spacing; and
T/2 is about 92.9 nsecs.

In certain embodiments, a few taps about the precursor, postcursor and the crossterm locations are placed at non-zero to account for effects of any birth-death events on the static multipath delays. The number of non-zero taps is estimated based upon the birth-death delay. In certain embodiments, the number of non-zero taps is about 5.

Figure 5:
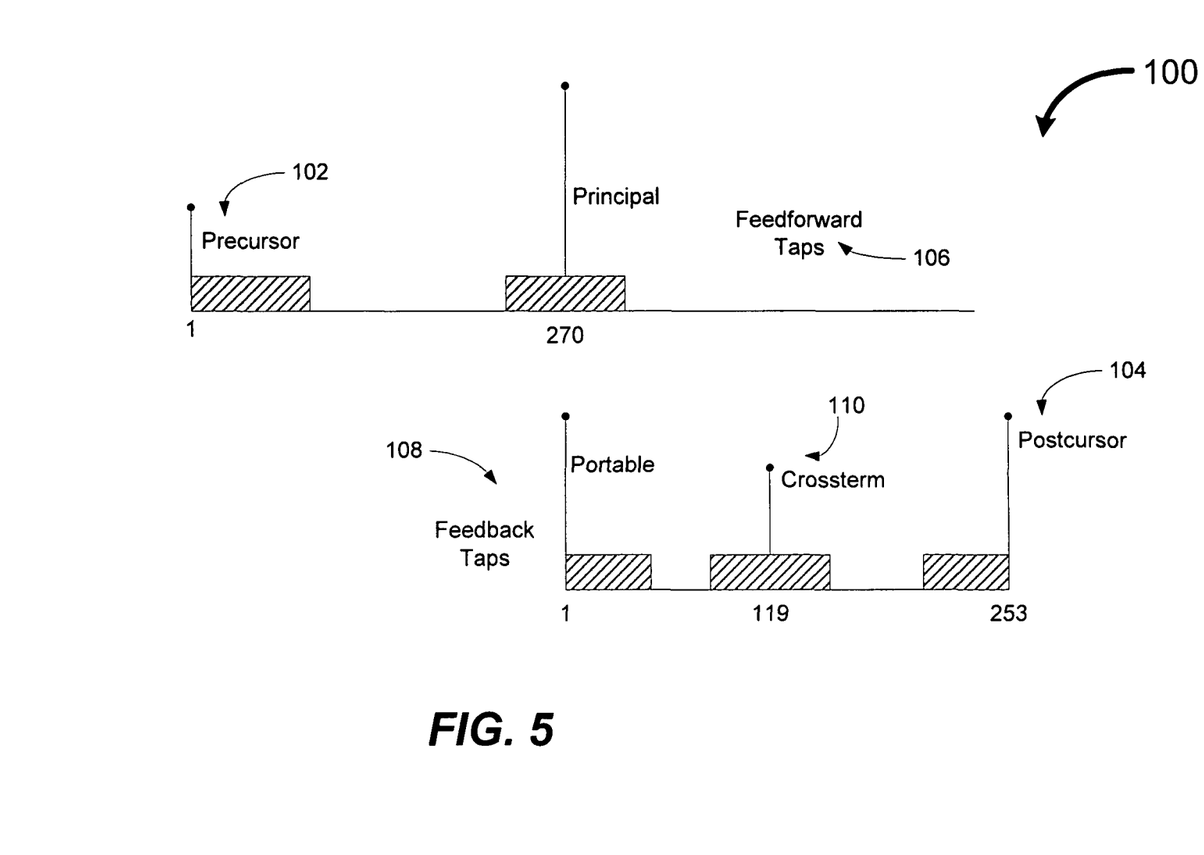
FIG. 5 illustrates exemplary positions of the taps of the equalizer of FIG. 2 in accordance with embodiments of present technique.

FIG. 5 illustrates exemplary positions 100 of the taps of the equalizer 32 of FIG. 2. In this exemplary embodiment, the precursor and the postcursor taps 102 and 104 are at −25 μsecs and 47 μsecs respectively. The feedforward section 106 is about T/2 spaced and the feedback section 108 is about T spaced. Further, as described above, the crossterm 110 is about 118.5 T spaced.

Figure 6:
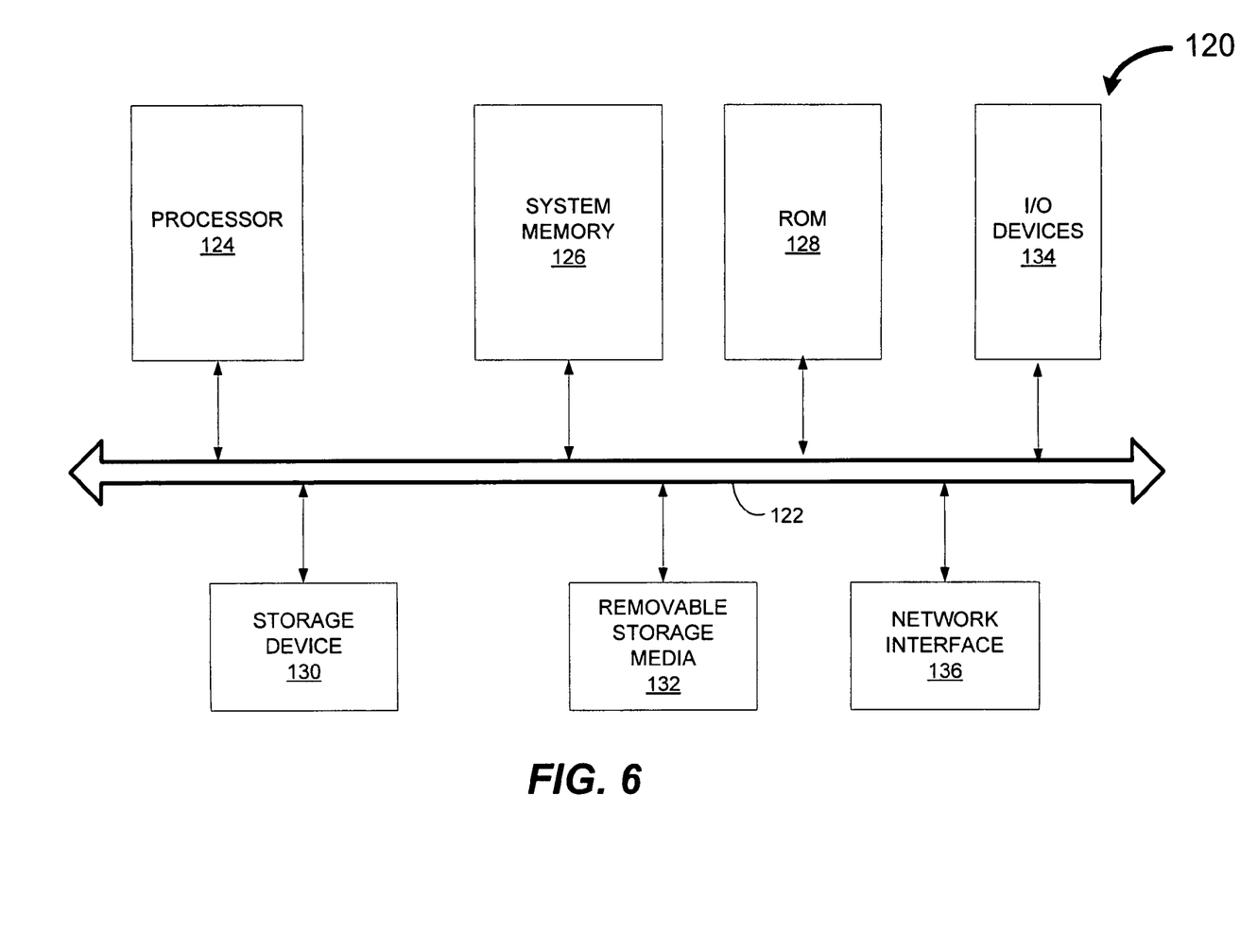
FIG. 6 illustrates an embodiment of a computer system.

The communication system 20 described above may be disposed in a computer system, a wireless communicator and a hand-held device. FIG. 6 illustrates an embodiment of a computer system 120. The computer system 120 includes a bus 122 to which the various components are coupled. In certain embodiments, the bus 122 includes a collection of a plurality of buses such as a system bus, a Peripheral Component Interface Express (PCIe) bus, etc. Representation of these buses as a single bus 122 is provided for ease of illustration, and it should be understood that the system 120 is not so limited. Those of ordinary skill in the art will appreciate that the computer system 120 may have any suitable bus architecture and may include any number of combination of buses.

A processor 124 is coupled to the bus 122. The processor 124 may include any suitable processing device or system, including a microprocessor (e.g., a single core or a multi-core processor), a network processor, an application specific integrated circuit (ASIC), a graphics processor (GPU), or a field programmable gate array (FPGA), or any similar device. It should be noted that although FIG. 6 shows a single processor 124, the computer system 120 may include two or more processors.

The computer system 120 further includes system memory 126 coupled to the bus 122. The system memory 126 may include any suitable type and number of memories, such as static random access memory (SRAM), dynamic random access memory (DRAM), synchronous dynamic random access memory (SDRAM), or double data rate DRAM (DDRDRAM). During operation of the computer system 120, an operating system and other applications may be resident in the system memory 126.

The computer system 120 may further include a read-only memory (ROM) 128 coupled to the bus 122. The ROM 128 may store instructions for the processor 124. The computer system 120 may also include a storage device (or devices) 130 coupled to the bus 122. The storage device 130 includes any suitable non-volatile memory, such as, for example, a hard disk drive. The operating system and other programs may be stored in the storage device 130. Further, a device 132 for accessing removable storage media (e.g., a floppy disk drive or a CD ROM drive) may be coupled to the bus 122.

The computer system 120 may also include one or more Input/Output (I/O) devices 134 coupled to the bus 122. Common input devices include keyboards, pointing devices such as a mouse, as well as other data entry devices. Further, common output devices include video displays, printing devices, and audio output devices. It will be appreciated that these are but a few examples of the types of I/O devices that may be coupled to the computer system 120.

The computer system 120 may further comprise a network interface 136 coupled to the bus 122. The network interface 136 comprises any suitable hardware, software, or combination of hardware and software that is capable of coupling the system 120 with a network (e.g., a network interface card). The network interface 136 may establish a link with the network over any suitable medium (e.g., wireless, copper wire, fiber optic, or a combination thereof) supporting exchange of information via any suitable protocol such as TCP/IP (Transmission Control protocol/Internet Protocol), HTTP (Hyper-Text Transmission Protocol, as well as others.

It should be understood that the computer system 120 illustrated in FIG. 6 is intended to represent an embodiment of such a system and, further, that this system may include any additional components, which have been omitted for clarity and ease of understanding. By way of example, the system 120 may include a direct memory access (DMA) controller, a chip set associated with the processor 124, additional memory (e.g., cache memory) as well as additional signal lines and buses. Also, it should be understood that the computer system 120 may not include all the components shown in FIG. 6. The computer system 120 may comprise any type of computing device, such as a desktop computer, a laptop computer, a server, a hand-held computing device, a wireless communication device, an entertainment system etc.

In this embodiment, the computer system 120 may include the communication system as described in the embodiments above. By way of example, the computer system 120 may include a receiver to receive a plurality of carrier signals and a channel estimator to analyze each of the plurality of signals to identify at least one of a static multipath delay and a dynamic multipath delay in the signals. The computer system 120 may also include an equalizer having a plurality of taps, wherein the equalizer is configured based upon the at least one of the static and dynamic multipath delays.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

The invention claimed is:

1. A method, comprising:
   receiving a carrier signal;
   analyzing the received carrier signal to identify at least one of a static multipath delay and a dynamic multipath delay in the received carrier signal; and
   configuring an equalizer based upon the at least one of the static and dynamic multipath delays,
   wherein the configuring the equalizer comprises estimating a required number of taps of the equalizer to equalize the at least one of the static and dynamic multipaths, and partitioning the required number of taps into first and second set of taps;
   wherein the first set of taps is to equalize the static multipath delay and the second set of taps is to equalize the dynamic multipath delay and wherein the configuring the equalizer comprises determining a position for each of the first and second set of taps of the equalizer.

2. The method of claim 1, wherein the equalizer comprises a sparse decision-feedback equalizer.

3. The method of claim 2, wherein configuring the equalizer comprises estimating an adaptation constant of a least mean square (LMS) algorithm employed by the equalizer.

4. The method of claim 1, comprising providing the second set of taps in feedforward and feedback sections of the equalizer to equalize the dynamic multipath delay.

5. The method of claim 4, wherein number of taps in the second set of taps is less than 32.

6. The method of claim 1, wherein the position of each of first set of taps is based upon a delay length of the static multipath delay.

7. The method of claim 1, wherein analyzing the received carrier signal comprises comparing a received pseudo-random noise (PN) sequence with a reference sequence to identify the at least one of the static and dynamic multipath delays.

8. The method of claim 1, wherein the dynamic multipath delay corresponds to delay caused by reflection from a plurality of moving objects disposed in proximity of an antenna of the equalizer.

9. The method of claim 1, wherein the static multipath delay corresponds to delay caused by reflection from a plurality of static objects.

10. A communication module, comprising:
    a receiver to receive a plurality of carrier signals;
    a channel estimator to analyze each of the plurality of the carrier signals to identify at least one of a static multipath delay and a dynamic multipath delay in the carrier signals; and
    an equalizer having a plurality of taps, wherein the equalizer is configured based upon the at least one of the static and dynamic multipath delays;
    wherein the equalizer comprises a first set of taps to equalize the static multipath delay and a second set of taps to equalize the dynamic multipath delay and wherein configuring the equalizer comprises determining a position for each of the first and second set of taps of the equalizer.

11. The communication module of claim 10, wherein the channel estimator is to compare a received pseudo-random noise (PN) sequence from the receiver with a reference sequence to identify the at least one of the static and dynamic multipath delays.

12. The communication module of claim 10, wherein the equalizer comprises a sparse decision-feedback equalizer (DFE).

13. The communication module of claim 10, wherein the second set of taps comprises a pre-determined number of taps in a feedforward section and a feedback section of the equalizer to equalize the dynamic multipath delay.

14. The communication module of claim 10, wherein the position of each of the first set of taps is based upon a delay length of the static and dynamic multipath delays.

15. A device, comprising:
    a central processing unit; and
    a communication module comprising:
      a receiver to receive a plurality of carrier signals;
      a channel estimator to analyze each of the plurality of the carrier signals to identify at least one of a static multipath delay and a dynamic multipath delay in the carrier signals; and
    an equalizer having a plurality of taps, wherein the equalizer is configured based upon the at least one of the static and dynamic multipath delays;
    wherein the equalizer comprises a first set of taps to equalize the static multipath delays and a second set of taps to equalize the dynamic multipath delays and wherein configuring the equalizer comprises determining a position for each of the first and second set of taps of the equalizer.

16. The device of claim 15, wherein the device comprises one of a portable computer, a wireless communicator and a hand-held device and wherein the channel estimator is implemented in software on the central processing unit.

* * * * *